(12) United States Patent
Ronen et al.

(10) Patent No.: US 7,171,543 B1
(45) Date of Patent: Jan. 30, 2007

(54) METHOD AND APPARATUS FOR EXECUTING A 32-BIT APPLICATION BY CONFINING THE APPLICATION TO A 32-BIT ADDRESS SPACE SUBSET IN A 64-BIT PROCESSOR

(75) Inventors: Ronny Ronen, Haifa (IL); Alexander Peleg, Haifa (IL)

(73) Assignee: Intel Corp., Santa Clara, CA (US)

( * ) Notice: Subject to any disclaimer, the term of this patent is extended or adjusted under 35 U.S.C. 154(b) by 0 days.

(21) Appl. No.: 09/536,452

(22) Filed: Mar. 28, 2000

(51) Int. Cl.
*G06F 9/34* (2006.01)
(52) U.S. Cl. ...................................... 712/209; 711/212
(58) Field of Classification Search ................ 712/209, 712/229; 711/212, 213, 214
See application file for complete search history.

(56) References Cited

U.S. PATENT DOCUMENTS

| | | | | |
|---|---|---|---|---|
| 5,140,684 A | * | 8/1992 | Sakamura et al. | 711/163 |
| 5,420,992 A | * | 5/1995 | Killian et al. | 703/27 |
| 5,638,525 A | * | 6/1997 | Hammond et al. | 712/209 |
| 5,774,686 A | * | 6/1998 | Hammond et al. | 712/209 |

OTHER PUBLICATIONS

Hennessy and Patterson, Computer Architecture—A Quantitative Approach, 2nd Edition, p. A-8 to A-11.*
Microsoft Corporation, "Microsoft Interface Definition Language (MIDL): 64-Bit Porting Guide," Aug. 1999, pp. 1-19.*
Intel Architecture Software Developer's Manual, Basic Architecture, vol. 1, pp. 2-1-2-13, 1999.

* cited by examiner

*Primary Examiner*—Eddie Chan
*Assistant Examiner*—David J. Huisman
(74) *Attorney, Agent, or Firm*—Kenyon & Kenyon LLP

(57) ABSTRACT

Apparatus and methods to execute an instruction of an application of a first bit size ported to a second bit size environment, including methods and apparatus to confine the application to a first bit size address space subset. An embodiment in accordance with the present invention includes a method to confine an application to an address space subset, the method including determining that the application is confined to a first bit size address subset, the application including an instruction; generating an address reference of a second bit size as part of execution of the instruction; truncating the generated address reference from the second bit size to the first bit size; and extending the truncated, generated address reference from the first bit size to the second bit size based at least in part on an address format control flag.

20 Claims, 2 Drawing Sheets

METHOD AND APPARATUS FOR EXECUTING A 32-BIT APPLICATION BY CONFINING THE APPLICATION TO A 32-BIT ADDRESS SPACE SUBSET IN A 64-BIT PROCESSOR

FIELD OF THE INVENTION

Embodiments of the present invention relate to a microprocessor. More particularly, embodiments of the present invention relate to confining an application to a 32-bit address space subset in a 64-bit processor.

BACKGROUND OF THE INVENTION

Known 64-bit processors can execute 64-bit applications having 64-bit data types and 64-bit addressing. 32-bit applications typically have 32-bit data types and 32-bit addressing. Porting a 32-bit application into a 64-bit environment can result in errors when dealing with 32-bit numbers in a 64-bit environment. For example, a wrong address can be produced when a 32-bit address is incorrectly sign/zero extended. Incorrect content (e.g., an overflow value) can be introduced into the high-order 32 bits of a 64-bit data item when 32-bit data is moved within general purpose registers. An error can also be propagated when an operation (e.g., address generation, etc.) uses an erroneous interim result. In view of the foregoing, it can be appreciated that a substantial need exists for methods and apparatus which can advantageously support execution of 32-bit applications by a 64-bit microprocessor.

DETAILED DESCRIPTION

Figure 1:
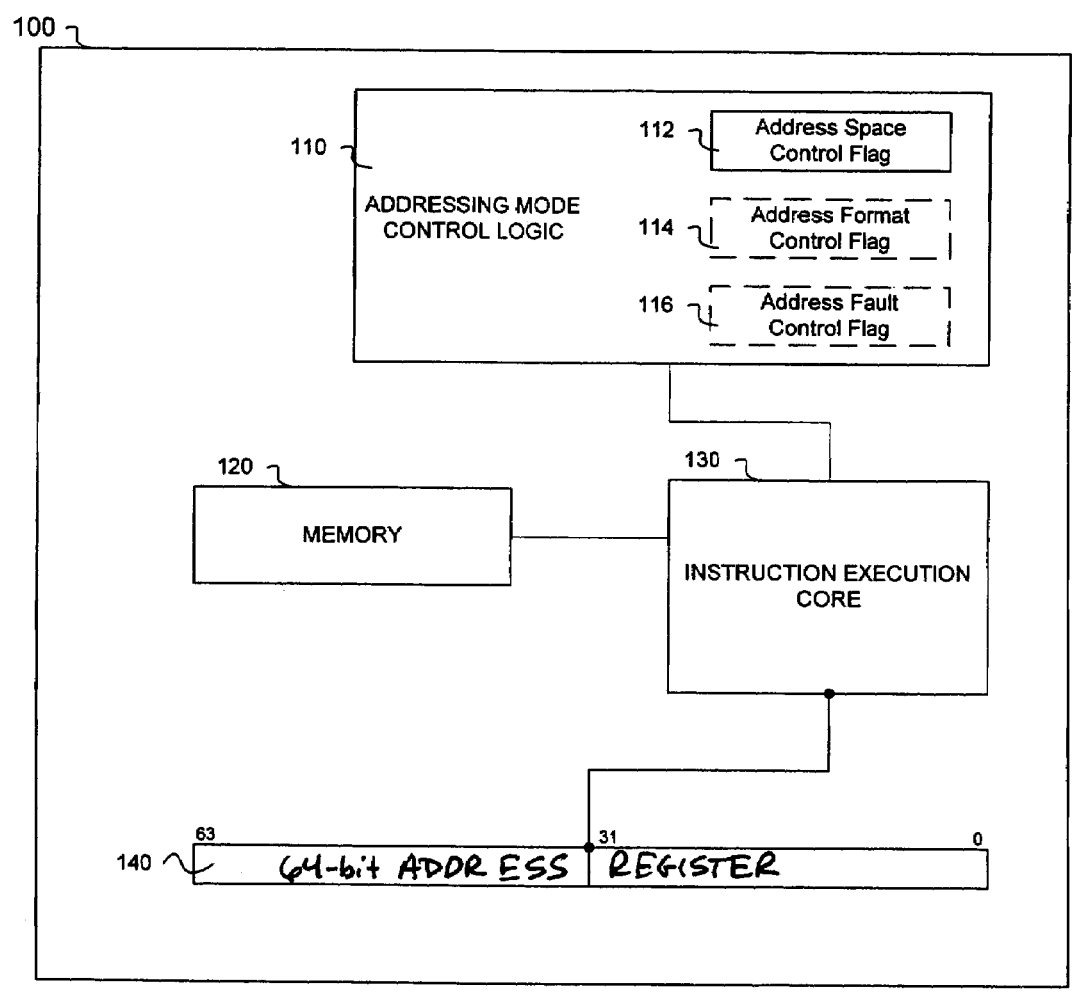
FIG. 1 is an illustration of an apparatus in accordance with an embodiment of the present invention.

According to embodiments of the present invention, a processor can include control logic to treat a memory reference of an application as a 32-bit memory reference. In one embodiment, the processor can execute an application, and the application can specify that it uses 32-bit addresses by setting an address space control flag. The processor can determine whether the address space control flag has been set. When the control flag is set, the processor can truncate a generated address space control flag. The processor can determine whether the address space control flag has been set. When the control flag is set, the processor can truncate a generated address into a 32-bit address and either zero-extend or sign-extend to 64-bits the truncated 32-bit address. In one embodiment, a processor can determine whether to zero-extend or sign-extend a truncated 32-bit address based at least in part on whether an address format control flag specifies unsigned addresses (that can be zero-extended) or signed addresses (that can be sign-extended). In another embodiment, a processor can determine whether an address fault control flag can be set. When the address fault control flag is set, in one embodiment, the processor can generate a fault when a generated address is not within a proper 32-bit address space subset. When the address fault control flag is clear, the processor can truncate a generated address and zero/sign-extend the truncated address.

In an embodiment of the present invention, a 32-bit application ported to a 64-bit environment can be executed by a 64-bit processor and operate within a virtual address space. For example, a 32-bit application can operate within an unsigned 0 to 4 GB (gigabyte) virtual address space. Alternatively, a 32-bit application can operate within a signed −2 GB to +2 GB virtual address space.

A 64-bit processor can execute, in an embodiment of the present invention, a 32-bit application that has been ported into a 64-bit environment. The 64-bit processor can include control logic to allow the ported 32-bit application to specify that it uses 32-bit addresses and to instruct the processor to confine the application to a 32-bit address space subset. The processor can confine the application to a 32-bit address space subset by treating a memory reference as a 32-bit access. A memory reference comprising a generated address can be treated as a 32-bit access by truncating the generated address to 32 bits and either zero-extending or sign-extending the truncated generated address to 64 bits.

Confining the application to a 32-bit address sublet can compensate for incorrect content that can be introduced into the high order 32 bits of a 64-bit data item when a 32-bit data item is moved and/or part of an operation within a 64-bit general purpose register. One category of such incorrect content relates to wraparound errors. 32-bit operations that wraparound in a 32-bit environment can, when executed in a 64-bit environment, cause the high-order 32 bits of a 64-bit data item to include a value other than 0 ("0" encompasses a value of 0) or 0xFFFF:FFFFH ("FFFF:FFFFH" encompasses a hexadecimal value of FFFF:FFFF). A wraparound error can be caused by, for example, propagation of a carry bit from the low-order 32 bits into the high-order 32 bits. A wraparound error can cause subsequent additional computation errors. Misinterpretation of an operand as a signed or unsigned number can fall under this category. For example, adding 0xFFFF:FFFFH to 0x0000:0002H results in 0x0000: 0001H when the 32-bit operands are signed, but results in 0x1:0000:0001H when the 32-bit operands are unsigned. In a 32-bit environment, the result always wraps to 0x0000: 0001H.

Contamination of the high-order 32 bits of a 64-bit number may not be an issue when the computed result is to be stored in a 32-bit data item. When such contamination has occurred and the computed result is to be stored in a 64-bit data item, it can lead to additional errors that affect the results of a computation sequence. For example, an address error can occur. When the computed data item is used to address a data item in memory (e.g., in a 64-bit address space), the computation error can lead to a load or store from an incorrect address.

FIG. 1 is an illustration of an apparatus in accordance with an embodiment of the present invention. In an embodiment, a 64-bit processor 100 can execute a 32-bit application that has been ported into a 64-bit environment. The 64-bit processor 100 can include addressing mode control logic 110 having a control flag (e.g., a control bit, etc.) that can specify (e.g., when set, when clear, etc.) that the ported 32-bit application is to be confined to a 32-bit address space subset and use 32-bit addresses. In an embodiment, the processor 100 is running the ported 32-bit application under a 64-bit operating system.

In one embodiment, addressing mode control logic 110 can include an address space control flag 112. In an embodiment, a control flag of addressing mode control logic 110 (e.g., the address space control flag 112) can be set by the ported 32-bit application (e.g., the processor 100 executes an instruction to set the address space control flag 112). In another embodiment, the ported 32-bit application can communicate to a 64-bit operating system that a control flag of addressing mode control logic 110 (e.g., the address space control flag 112) of processor 100 is to be set, and the 64-bit operating system communicates such to processor 100.

When the address space control flag 112 is set, the processor 100 can treat generated address references of the ported 32-bit application as 32-bit addresses by truncating generated address references to 32 bits. For example, memory 120 can store an instruction of ported 32-bit application. Memory 120 can be a cache, an instruction cache, a volatile memory, a non-volatile memory, etc. Instruction execution core 130 can receive the instruction from memory 120. When the instruction is executed, a generated address reference can include 64 bits and be stored in 64-bit register 140. When address space control flag 112 is set, the instruction execution core (or associated logic) can truncate the 64-bit generated address to 32 bits. In an embodiment of the present invention, when a virtual address space used by the ported 32-bit application is a signed address space, the truncated generated address references can be sign extended to 64 bits. When a virtual address space used by the ported 32-bit application is an unsigned address space, the truncated generated address references can be zero extended to 64 bits. In an embodiment, when address space control flag 112 is clear, processor 100 can treat generated address references as 64-bit addresses. In another embodiment, the process can treat all generated address references as 32-bit addresses when an address space control flag 112 is clear and as 64-bit addresses when an address space control flag 112 is set.

In an embodiment of the present invention, addressing mode control logic 10 can include address space control flag 112 and an address format control flag 114. Address format control flag 114 can specify whether a 32-bit truncated, generated address reference is to be sign-extended or zero-extended. In an embodiment, when address format control flag 114 is set, processor 100 can treat generated address references as unsigned 32-bit addresses. In such an embodiment, when address format control flag 114 is set, the processor can truncate a 64-bit generated address reference to 32 bits and zero-extend the truncated, generated address reference to 64 bits. When address control flag 114 is clear, processor 100 can treat generated address reference as signed 32-bit addresses by truncating a 64-bit generated address reference to 32 bits and sign-extending the truncated, generated address reference to 64 bits. In another, embodiment, truncated generated address references are sign-extended when address format control flag 114 is set and zero-extended when address format control flag 114 is clear. In an embodiment, the address format control flag 114 can be ignored unless the address space control flag 112 specifies that the ported 32-bit application is to be confined to the 32-bit address space subset.

In a further embodiment of the present invention, addressing mode control logic 110 can include address space control flag 112 and an address fault control flag 116. When address fault control flag 116 is set and address space control flag 112 specifies that a ported 32-bit application running under a 64-bit operating system is to be confined to a 32-bit address space subset, processor 100 can generate an address fault when a generated address reference is not in the proper 32-bit address space subset (e.g., the generated address includes a wraparound error, etc.). For example, after a truncated, generated address reference is sign/zero-extended, the resultant address reference can be compared to the original generated address reference. When the two are different, the address fault can be generated. When the two are not different, the resultant address reference can be used (e.g., as an operand address, as a branch target address, etc.) In another embodiment, when the two are different the address fault can be generated and the resultant address reference can be used. In an embodiment, a resultant address reference can refer to the entire address range covered by an accessed data type. For example, access to a doubleword at address 0xFFFF:FFFEH can include the range 0xFFFF:FFFEH-0x1H.

When address fault control flag 116 is clear and address space control flag 112 specifies that a ported 32-bit application running under a 64-bit operating system is to be confined to a 32-bit address space subset, processor 100 need not generate an address fault when a generated address reference is not in the proper 32-bit address space subset. Rather, the processor 100 can truncate generated address references and sign/zero-extend the truncated, generated address references. In an embodiment, the address fault control flag 116 can be ignored unless the address space control flag 112 specifies that the ported 32-bit application is to be confined to the 32-bit address space subset. In an embodiment, when the address space control flag 112 specifies that the ported 32-bit application is to be confined to the 32-bit address space subset, address faults can be generated when address fault control flag 116 is cleared and address faults need not be generated when address fault control flag 116 is set. Address fault control flag 116, in an embodiment, can be used by a debugger to help detect problems in porting a 32-bit application to a 64-bit environment.

Figure 2:
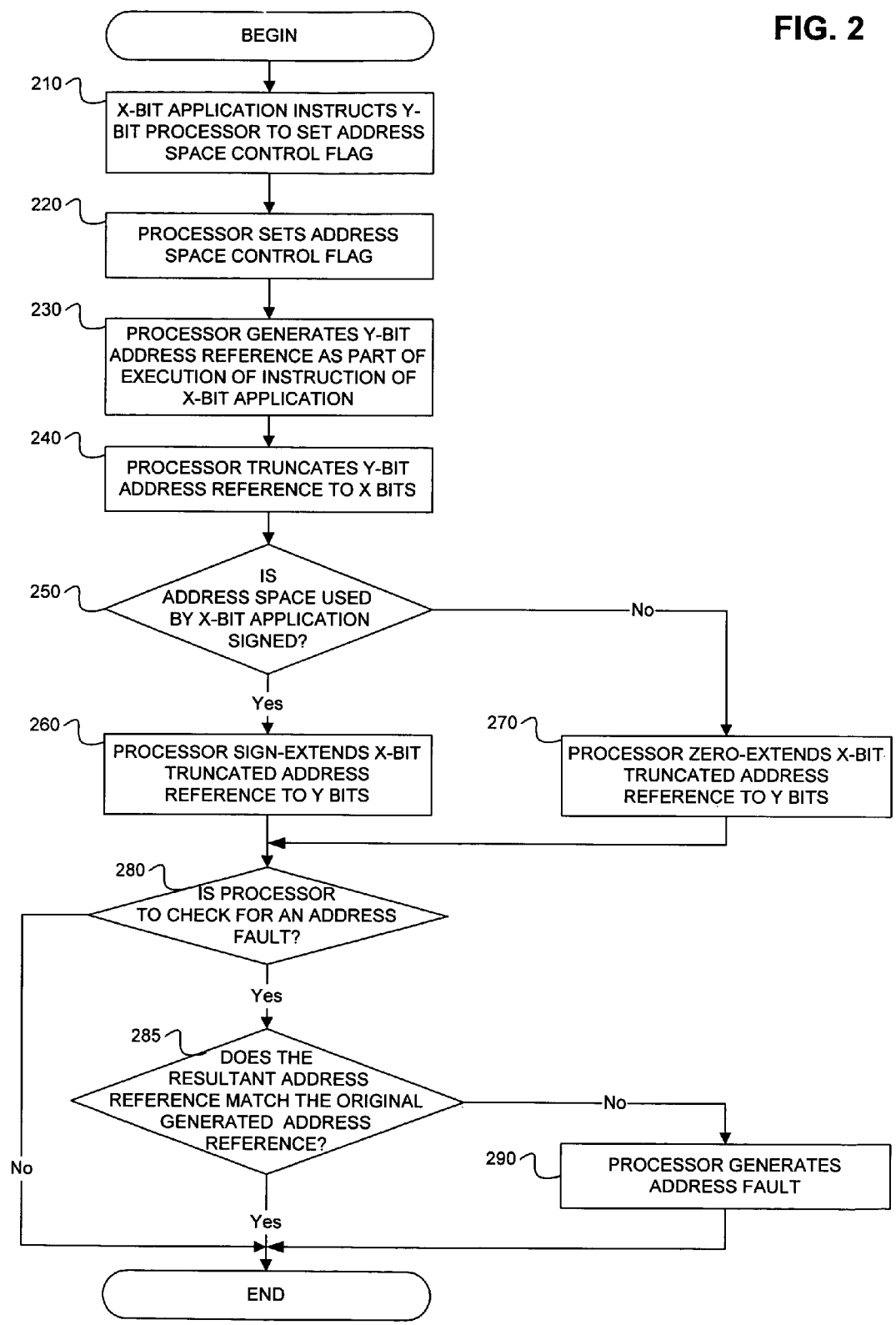
FIG. 2. shows a method in accordance with an embodiment of the present invention.

FIG. 2 shows a method in accordance with an embodiment of the present invention. An x-bit application can be executed on a y-bit processor in an x-bit address space subset. In an embodiment, the x-bit application is a 32-bit application and the y-bit processor is a 64-bit processor. In another embodiment, the x-bit application is a 64-bit application and the y-bit processor is a 128-bit processor. In a further embodiment, the x-bit application is a 32-bit application and the y-bit processor is a 96-bit processor. In an embodiment of the present invention, an x-bit application can be executed on a y-bit processor where y>x.

An x-bit application can instruct a y-bit processor (processor) to set an address space control flag (box 210), and processor can set address space control flag (box 220). Processor can generate a y-bit address reference as part of execution of an instruction of x-bit application (box 230). The processor can truncate y-bit address reference to x bits (box 240). The processor can determine whether the address space used by x-bit application is signed (decision 250). When the address space used by x-bit application is signed, the processor can sign-extend x-bit truncated address reference to y bits (box 260). When the address space used by x-bit application is not signed, the processor can zero-extend x-bit truncated address reference to y bits (box 270). The processor can determine whether it is to check for an address fault (e.g., by checking the status of an address fault control flag, etc.) (decision 280). When the processor is to check for an address fault, the processor can compare the resultant address reference (e.g., the truncated and sign/zero-extended address reference) to the original generated address reference (e.g., the y-bit address reference generated in box 230) (box 285). When the resultant address reference does not match the original generated address reference, the processor can generate an address fault (box 290).

In an embodiment of the present invention, a processor can include addressing mode control logic include an address space control flag, an address format control flag, and an address fault control flag. The address space control flag can be modified in any privilege level and can belong to a process context. In an embodiment when a 64-bit processor is running a 32-bit operating system, the address space control flag can be ignored or considered set. In an embodiment, the address format control flag can be modified in a supervisor privilege level only and can be a global machine flag. The address format control flag can be set at boot time of a computer system including the processor. The address fault control flag, in an embodiment, can be modified in supervisor privilege level only. The address fault control flag can belong to the process context.

In a further embodiment of the present invention, software (e.g., one or more applications, one or more application and an operating system, an operating system, etc.) can include ported 32-bit software and 64-bit software and can use an address space control flag in a manner that can affect performance. Frequent switches of the address space control flag can decrease application performance. Accordingly, in one embodiment, software can strive to minimize the number of switches of the address space control flag. In one embodiment, a performance model of executing a ported 32-bit application in a 64-bit environment can specify that code (e.g., application code) and data that can be accessed by the ported 32-bit application can be allocated in a 32-bit address space subset. This can include all DLLs (Dynamically Linked Loadables) and the data to which the DLLs refer. This can eliminate the need to perform an address space control flag mode switch on each call to a 64-bit service. Cases where access to code or data beyond the 32-bit subset can call for an address space control flag mode switch. In one embodiment, a thunk layer (e.g., code that can interface procedures run in two different modes and/or calling conventions, etc) can interface between ported 32-bit application code and 64-bit code and can have the responsibility of switching the address space control flag. The address space control flag can be set on a call to a 64-bit service and cleared upon return to the ported 32-bit application.

Methods and apparatus in accordance with embodiments of the present invention can advantageously support execution of 32-bit applications ported to a 64-bit environment. Execution of an instruction in accordance with an embodiment of the present invention can compensate for incorrect content (e.g., a wraparound error) that can be introduced into the high-order 32 bits of a 64-bit data item when a 32-bit data item is moved and/or part of an instruction operation. A known method of addressing such incorrect content can zero/sign extend each data value before it is used, but system performance is degraded. Software compilers can lessen such degradation of system performance by analyzing the code of the ported application and performing such zero/sign extension operations when necessary. Embodiments of the present invention can compensate for incorrect content without significant performance degradation. A software compiler need not analyze the code to perform necessary zero/sign extensions, and the software need not include additional instructions to fix data values having incorrect content.

Embodiments of methods and apparatus to confine a 32-bit application ported to a 64-bit environment to a 32-bit address space subset have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, apparatus and methods in accordance with embodiments of the present invention have been described with reference to specific exemplary embodiments. Accordingly, the present specification and figures are to be regarded as illustrative rather than restrictive.

What is claimed is:

1. A processor comprising:
   means for executing an instruction of an application of a first bit size ported to a second bit size environment, the second bit size being greater than the first bit size; and
   means for confining the application to an address space subset of the first bit size, said means for confining comprising:
   means for truncating generated address references of the second bit size to the first bit size;
   means for determining that the address space subset of the first bit size is signed address space or unsigned address space based on a setting of an address format control signal, the address format control signal having a first setting to indicate unsigned address space and a second setting to indicate signed address space; and
   means for extending to the second bit size the truncated generated address references based on results from said means for determining, zero-extending the truncated generated address references if the address space subset of the first bit size is unsigned and sign-extending the truncated generated address references if the address space subset of the first bit size is signed.

2. The processor of claim 1, wherein the first bit size is 32-bit and the second bit size is 64-bit.

3. The processor of claim 2, wherein the unsigned address space is 4 gigabytes and the signed address space is −2 gigabytes to +2 gigabytes.

4. The processor of claim 1, wherein the means for confining includes means for generating an address fault.

5. The processor of claim 4, wherein said means for generating the address fault comprises:
   means for comparing a generated address reference as input into said means for truncating with an extended, truncated, generated address reference as output by said means for extending,
   wherein said means for generating the address fault outputs that an address fault has occurred only if:
   an output of said means for comparing indicates that the compared addresses are different, and
   an address fault control signal specifies to check for the address fault.

6. A processor comprising:
   a memory to store an instruction of an application ported from a first bit size environment to a second bit size environment, the second bit size being greater than the first bit size; and
   an instruction execution core coupled to said memory, said instruction execution core to execute the instruction of the application, said instruction execution core to
   determine that the application is confined to an address space subset of the first bit size;

generate an address reference of the second bit size as part of execution of the instruction;

truncate the generated address reference from the second bit size to the first bit size;

determine that the address space subset of the first bit size is signed address space or unsigned address space based on a setting of an address format control flag, the address format control flag having a first setting to indicate unsigned address space and a second setting to indicate signed address space;

zero extend the truncated, generated address reference to the second bit size if the address space subset of the first bit size is determined to be unsigned address space; and sign extend the truncated, generated address reference to the second bit size if the address space subset of the first bit size is determined to be signed address space.

7. The processor of claim 6, wherein the application ported from a first bit size environment to a second bit size environment is an application ported from a 32-bit environment to a 64-bit environment.

8. The processor of claim 7, wherein the unsigned address space is 4 gigabytes and the signed address space is −2 gigabytes to +2 gigabytes.

9. The processor of claim 6, wherein the instruction execution core is to determine that the application is confined to the address space subset of the first bit size based at least in part on an address space control flag.

10. The processor of claim 6, wherein the instruction execution core is to generate an address fault flag based at least in part on a comparison of the generated address reference and the extended, truncated, generated address reference.

11. The processor of claim 10, wherein the instruction execution core is to generate the address fault flag only if:
the comparison of the generated address reference and the extended, truncated, generated address reference indicates that the compared addresses are different, and an address fault control flag specifies to check for an address fault.

12. The processor of claim 11, wherein the instruction execution core is to generate the address fault flag if:
the application is confined to the address space subset of the first bit size,
the comparison of the generated address reference and the extended, truncated, generated address reference indicates that the compared addresses are different, and
the address fault control flag specifies to check for the address fault.

13. The processor of claim 6, wherein said memory is a cache memory.

14. The processor of claim 6, wherein the processor is a 64-bit processor.

15. A method comprising:
determining that an application is confined to an address subset of a first bit size, the application including an instruction;

generating an address reference of a second bit size as part of execution of the instruction;

truncating the generated address reference from the second bit size to the first bit size;

determining that the address space subset of the first bit size is signed address space or unsigned address space based on a setting of an address format control flag, the address format control flag having a first setting to indicate unsigned address space and a second setting to indicate signed address space;

zero-extending the truncated, generated address reference to the second bit size if the address space subset of the first bit size is determined to be unsigned address space; and sign-extending the truncated, generated address reference to the second bit size if the address space subset of the first bit size is determined to be signed address space.

16. The method of claim 15, wherein the application is ported from a 32-bit environment to a 64-bit environment.

17. The method of claim 16, wherein the unsigned address space is 4 gigabytes and the signed address space is −2 gigabytes to +2 gigabytes.

18. The method of claim 15, wherein said determining that the application is confined to the address subset of the first bit size is based at least in part on an address space control flag.

19. The method of claim 15, further comprising:
generating an address fault flag based at least in part on a comparison of the generated address reference and the extended, truncated, generated address reference.

20. The method of claim 19, wherein generating the address fault flag is further based in part on an address fault control flag, wherein the address fault flag is generated only if:
the comparison of the generated address reference and the extended, truncated, generated address reference indicates that the compared addresses are different, and
an address fault control flag specifies to check for an address fault.

* * * * *